E. E. CARTER & E. LIGHTFOOT.
ELECTRICALLY OPERATED CASH REGISTER AND MONEY CHANGING DEVICE.
APPLICATION FILED MAY 2, 1914.

1,172,195. Patented Feb. 15, 1916.

E. E. CARTER & E. LIGHTFOOT.
ELECTRICALLY OPERATED CASH REGISTER AND MONEY CHANGING DEVICE.
APPLICATION FILED MAY 2, 1914.

1,172,195. Patented Feb. 15, 1916.
6 SHEETS—SHEET 3.

Witnesses:
James M. Abbott
Marguerite Bates

Inventors.
Edward E. Carter,
Ernest Lightfoot.
By
Howard Strauss
Attys.

E. E. CARTER & E. LIGHTFOOT.
ELECTRICALLY OPERATED CASH REGISTER AND MONEY CHANGING DEVICE.
APPLICATION FILED MAY 2, 1914.

1,172,195.

Patented Feb. 15, 1916.
6 SHEETS—SHEET 4.

E. E. CARTER & E. LIGHTFOOT.
ELECTRICALLY OPERATED CASH REGISTER AND MONEY CHANGING DEVICE.
APPLICATION FILED MAY 2, 1914.

1,172,195.

Patented Feb. 15, 1916.
6 SHEETS—SHEET 6.

UNITED STATES PATENT OFFICE.

EDWARD E. CARTER AND ERNEST LIGHTFOOT, OF LOS ANGELES, CALIFORNIA, ASSIGNORS OF THREE-EIGHTHS TO C. F. HOLLAND, OF LOS ANGELES, CALIFORNIA.

ELECTRICALLY-OPERATED CASH-REGISTER AND MONEY-CHANGING DEVICE.

1,172,195.  Specification of Letters Patent.  Patented Feb. 15, 1916.

Application filed May 2, 1914. Serial No. 835,862.

*To all whom it may concern:*

Be it known that we, EDWARD E. CARTER and ERNEST LIGHTFOOT, both citizens of the United States, residing at Los Angeles, in the county of Los Angeles, State of California, have invented new and useful Improvements in Electrically-Operated Cash-Registers and Money-Changing Devices, of which the following is a specification.

This invention relates to electrically operated cash registers and money changing devices.

It is the object of this invention to provide an electrically operated mechanism for a cash register, whereby change from coins of various denominations can be automatically effected on depositing the different coins in coin receptacles and operating a registering mehanism according to the amount of a sale.

Another object is to provide an electrical change making mechanism so constructed and arranged that one or more coins of the same or different denominations may be simultaneously deposited in a single coin receptacle and the change comprising the difference between the amount of a sale and the sum or total value of the coins deposited will be automatically delivered on the operation of a registering mechanism denoting the amount of the sale and recording same, irrespective of the number or denominations of the coins deposited.

Another object is to provide means in a mechanism of the above character by which no change will be delivered where the amount of the sale and the denominations of the coins deposited agree.

A further object is to provide a cash register having a common coin receiver for the reception of coins of different diameters and values with means for distributing the coins throughout a series of discharge containers according to their various denominations, with electrically controlled means, whereby the depositing of a coin or coins in the receiver, irrespective of their size and value, will operate to control the discharge of other coins from the containers on the actuating of an indicating and recording controlling device indicating the amount of a sale, and to provide means whereby when any of the containers for coins of the higher denominations become empty the device will automatically effect the discharge of coins of smaller denomination corresponding in amount to that of a large denomination when in the course of a change making operation the coin of larger denomination would ordinarily be ejected.

Another object is to provide means in an electrically operated change making mechanism for ejecting a plurality of coins of the same denomination when such is necessary to make the proper change.

A further object is to provide an electrically operated change making attachment for cash registers, which will automatically operate to discharge a coin or coins of a value corresponding to the difference between the amount of a sale "rung up" on the cash register and any possible combination of coins of the same or different denominations deposited in the receiver and which will operate only to discharge coins of a denomination less than the smallest coin deposited in the receiver.

In carrying out the present invention a series of coin containers are provided as receptacles for coins of different denominations ranging from one cent to twenty dollars with coin ejecting means connected therewith, the coin ejectors on the cent, dime and dollar containers being adapted to eject one or more coins of the same denomination where occasion demands; a coin receiver fitted with electrical contact members in the form of a caliper; a bank of purchase keys for ringing up the amount of a sale, and electrical connections and actuating devices coöperating with the purchase keys, coin receiver and coin ejectors, whereby when a coin or coins of a certain value are deposited in the container and a sale rung up on the register of an amount less than the value of the coin or coins deposited the coin ejecting mechanism will operate to discharge coins from the container of a value equivalent to the difference between the amount of sale and the value of the coin or coins deposited.

The invention is illustrated in the accompanying drawings, in which.

Figure 13:
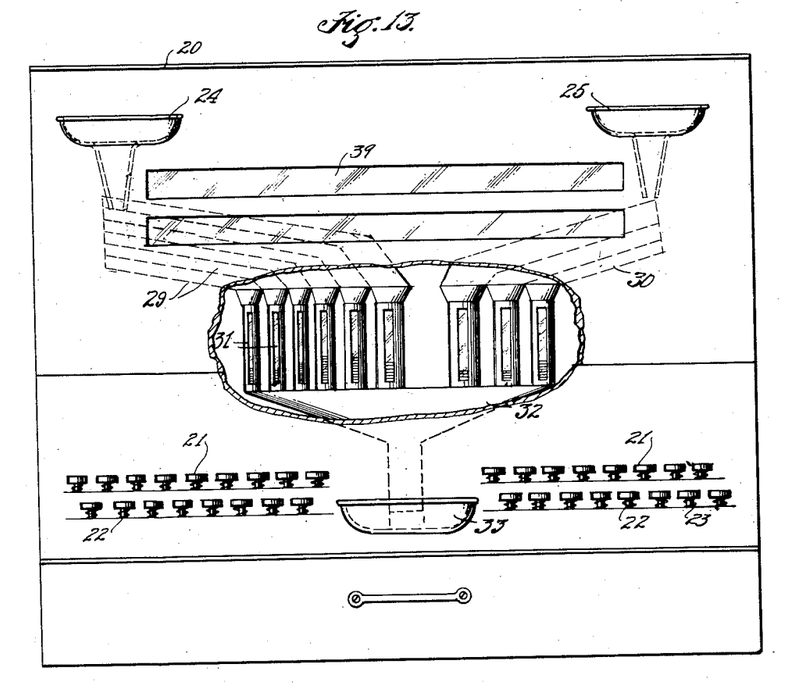
Fig. 13 is a view of the register and change maker in front elevation.

More specifically, reference being had to Fig. 13, 20 indicates the case of a cash register, which may be of any suitable construction, and 21 denotes the register keys for "ringing up" the amounts of purchases, which keys are here shown in the form of push buttons having downwardly extending stems 22 suitably guided in the case 20 and normally maintained in their uppermost position by springs 23. Coin receivers 24 and 25 are mounted on the case 20 and are designed to receive silver and gold coins respectively, which receivers connect with hoppers 27 and 28, shown in Fig. 1 and indicated in dotted lines in Fig. 3, which hoppers open at their lower ends to distributing chutes 29 and 30 arranged within the case 20 and leading to the coin containers 31; a coin container being provided for each denomination of coin ranging from one cent to twenty dollars of United States coinage. As illustrated in Fig. 13, the chutes 29 are adapted to receive the coins deposited in the receiver 24 and to separate them according to their different diameters and deliver them to their respective containers, while the chutes 30 separate the gold coins deposited in the receiver 25 and segregate them according to their diameters and deliver them to their respective containers. The chutes 29 and 30 may be constructed in any desired manner to accomplish this result.

It is manifest that the coin receivers 24 and 25, chutes 29 and 30 and containers 31 may be constructed and arranged to adapt them for the handling of coins of foreign countries, but for the purpose of illustration, the device will be described as applied to the handling of coinage of the United States. These containers 31 are disposed in vertical positions and the coins are designed to be stacked therein and supported on coin ejecting devices, to be later described, which are adapted to eject the coins from the containers and deliver them to a discharge chute 32 leading to a pocket 33 arranged on the front of the case 20 in convenient reach and from which the coins discharged from the containers 31 may be readily removed.

The sales register keys 21 are provided for the purpose of ringing up the amounts of sales and recording same by means of electrically operated devices; a key being provided for registering one, two, three and four cent purchases, and from five cents to one dollar arranged on an ascending scale of five cent denominations, and also two, three, four, five, ten and twenty dollar sales as in the ordinary cash registers. "No sale," "drawer" and "drop" keys are also provided.

Figure 14:
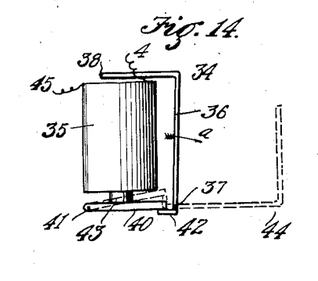
Fig. 14 is a detail in side elevation of the indicating mechanism.

The sales indicating device is of the annunciator type and is here shown as comprising a series of annunciator drops carrying purchase designating marks corresponding to the keys 21; a drop 34 being provided for each key, and adapted to be operated by separate magnets 35 controlled by the keys. One of these drops and the magnet for operating the same is particularly illustrated in Fig. 14 and includes a normally vertically extending plate 36 pivoted at 37 having its upper end bent at right angles to form a flange 38 on the upper face of which is formed the designating character; this plate being normally maintained in its vertical position to expose the blank outer face of the plate 36 through a reading opening 39 in the front of the case 20 by means of a weighted armature 40 pivoted at 41 having its outer end bearing upon a lip 42 formed on the lower end of the plate 36 below the pivot 37. The weight of the armature 40 is such as to retain the annunciator plate 36 in its vertical position. The magnet 35 is disposed above the armature 40 rearward of the plate 36 and has its core 43 so positioned in relation to the armature 40 that when the magnet 40 is energized the armature will be raised to the position indicated in dotted lines in Fig. 14 so as to permit the plate 36 to gravitate into a horizontal position against a stop 44 as indicated in dotted lines in Fig. 14 to expose the outer face of the flange 38 through the openings 39; the plate 36 being normally positioned slightly off center so as to fall forward in the direction of the arrow —a— in Fig. 14 when relieved of the weight of the armature 40. The drops may be restored to normal in any desired manner. One terminal of each of the annunciator magnets 35 connects with a conductor 45 leading to the negative terminal of a source of electrical current 46 of any suitable description, and the other terminal of each magnet 35 connects with a separate conductor 47 leading to a switch contact 48 normally out of connection with a contact member 49 on a conductor 50 leading to the positive terminal of the source of electrical current 46. A switch contact 48 is provided for each key 21 and is designed to be connected with its contact 49 on the depression of the key to energize the magnet 35 of a corresponding annunciator 34 on the downward movement of the stem 22 of the key to operate the annunciator to indicate the amount of a purchase. Each sale thus indicated is recorded by suitable electrically operated recording mechanism indicated in diagram at 51, Fig. 1, not shown in detail, as it comprises no part of the present invention. This sales recorder 51, however, is controlled by the switches 48.

Figures 8, 9, 10, 11, 12:
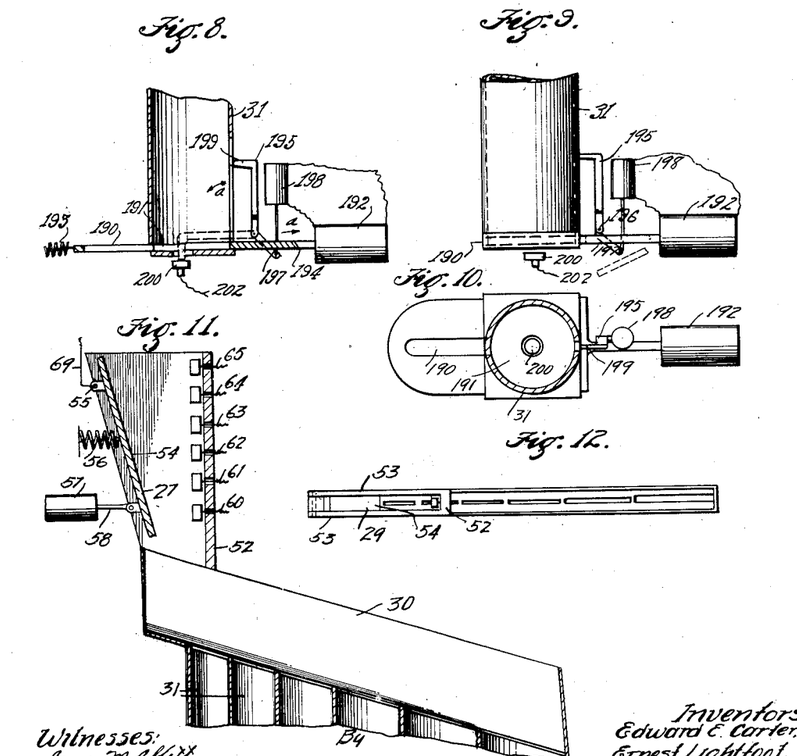
Fig. 8 is a detail in section of the coin ejector and container illustrating the device for controlling the circuit shown in Fig. 7, when the coin container is empty.
Fig. 9 is a view of same in side elevation.
Fig. 10 is a plan view of the coin container and discharge mechanism.
Fig. 11 is an enlarged detail vertical section of the coin receiver.
Fig. 12 is a plan of the receiving hoppers.

The receiving hoppers 27 and 28 are so constructed as to caliper and support the coins deposited therein in a vertical position, which construction is particularly illustrated in Figs. 11 and 12, and consists of a stationary vertically disposed wall 52 connected at its edges to parallel side walls 53 and a hinged wall or plate 54 pivoted at 55 and normally disposed at an incline in relation to the walls 52 to form a gradually converging space in the hopper extending from its open upper end to its open lower end. The plate 54 is normally maintained in its advanced position by means of a spring 56 and serves to temporarily support coins of different diameters at different horizontal planes within the hopper; the plate 54 being adapted to be retracted in opposition to the spring 56 by means of a solenoid magnet 57, the core 58 of which connects with the plate 54. The solenoid 57 operates, when energized as later described, to rock the plate 54 to release such coins as may be contained in the hopper to discharge them into the coin distributing and segregating chutes.

Arranged on the vertical end wall 52 of the hopper 27 opposite the inclined plate 54 is a series of contact members 60, 61, 62, 63, 64 and 65, which are superposed in relation to each other and are so arranged as to be respectively contacted by the peripheral edges of cents, dimes, nickels, quarter dollars, half dollars and dollars disposed in the hopper 27. The hopper 28 is constructed in a like manner excepting that it is proportioned to receive gold coins, namely, five, ten and twenty dollar pieces, and is fitted with superposed contact members 66, 67, and 68, arranged to be contacted by the respective gold coins mentioned when placed in the hopper 28.

The pivoted plates 54 of the hoppers 27 and 28 constitute electrical contact members and are connected to a conductor 69 leading to the positive side of the source of electrical supply 46. The contacts 60, 61, 62, 63, 64, 65, 66, 67 and 68 connect with conductors 70, 71, 72, 73, 74, 75, 76, 77, and 78, which lead to and are connected with one of the terminals of a series of magnets 80, 81, 82, 83, 84, 85, 86, 87 and 88, the other terminals of which magnets connect with a conductor 89 connecting with the conductor 45 leading from the negative side of the source of electrical supply 46. The magnets 81, to 88 inclusive, are provided for the purpose of actuating a series of contact members 90, 91, 92, 93, 94, 95, 96, 97 and 98, which normally bridge gaps between a plurality of alined contact members, which comprise a series switch which consists of a terminal contact member 99 and a plurality of spaced contacts 100, 101, 102, 103, 104, 105, 106, 107 and 108. The contact member 99 connects with the normally alive conductor 89 connected to the negative side of the source of electrical energy 46. The contact member 99 normally connects with the contact member 91, which also connects with the contact member 101 connecting with the contact member 92, which connects with the contact member 100; the remainder of the contact members in the switch series being connected as follows: From the contact member 100 contacts 90, 102, 93, 103, 94, 104, 95, 105 to 96, 106, 97, 107, 98 and 108, which latter contact member is the other terminal of the series switch. The contact members 90 and 92 are connected together so as to be moved out of connection with their respective contact members 100, 101, and 102 on energizing of the magnets 80 or 82. The contact members numbered 100 to 105, inclusive, and 106, 107 and 108, respectively, connect with conductors 110, 111, 112, 113, 114, 115, 116, 117 and 118, which connect with the terminals of coin ejector magnets 120, 121, 122, 123, 124, 125, 137, 138 and 139; the conductor 111 also connecting with coin ejector magnets 129, 130, 131, the conductor 112 connecting with magnets 122 and 132, and the conductor 115 further connecting with magnets 133, 134, 135 and 136. The magnets 121, 129, 130 and 131 are designed to control the discharge of coins from the one cent receptacle 31; each of these magnets controlling a separate coin ejector, to be later described, and operate, when one or more of the magnets are energized, to effect the discharge of a coin for each magnet energized. The magnet 120 controls the coin ejector of the five cent container, the magnets 122 and 132 control separate ejectors on the ten cent container, magnets 123 and 124 control coin ejectors on the twenty-five and fifty cent containers, the magnets 125 and 133, 134, 135 and 136 control separate coin ejectors on the dollar container, and the magnets 137, 138 and 139 control coin ejectors on the five, ten and twenty dollar gold coin containers, respectively.

Leading from the five cent ejector magnet 120 is a conductor 140. Leading from the one cent controlling magnets 121, 129, 130 and 131 are conductors 121', 137, 138 and 139, respectively, which lead to correspondingly numbered parallel horizontally extending bus-bars, which are superposed in relation to each other and arranged adjacent a bank of four register keys designated as 1¢, 2¢, 3¢ and 4¢, as particularly shown in Fig. 1. Leading from the magnets 120, 122, 132, 123, 124, 125, 133, 134, 135, 136, 137, 138, and 139 are conductors 140, 141, 142, 143, 144, 145, 146, 147, 148, 149, 150, 151 and 152, respectively which connect with correspondingly numbered parallel horizontally extending bus-bars arranged in superposed relation and spaced apart adjacent the stems 22 of the bank of sales register keys 21.

All of the enumerated bus-bars comprise terminals connecting with the negative side of the source of electrical energy 46 through the series switch and when the various contact members of the series switch are closed to one another the various bus-bars in live connection with the source of electrical energy but when any of the contacts of the series switch are separated the bus-bars connecting with the series switch above the point of separation will be thrown out of electrical connection with the source of electrical supply.

Figure 1:
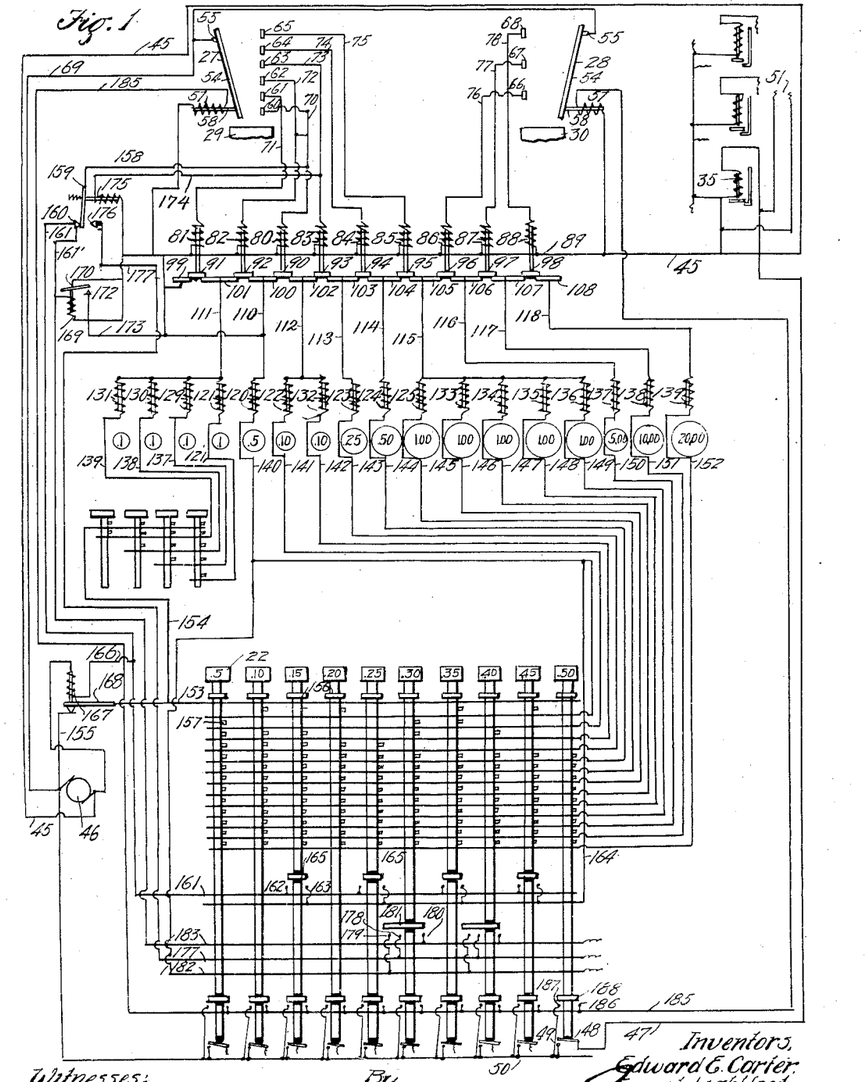
Figure 1 is a view in diagram of the electrical and mechanical devices employed in the main operation of the change making mechanism with parts removed for the sake of clearness.
Figure 2:
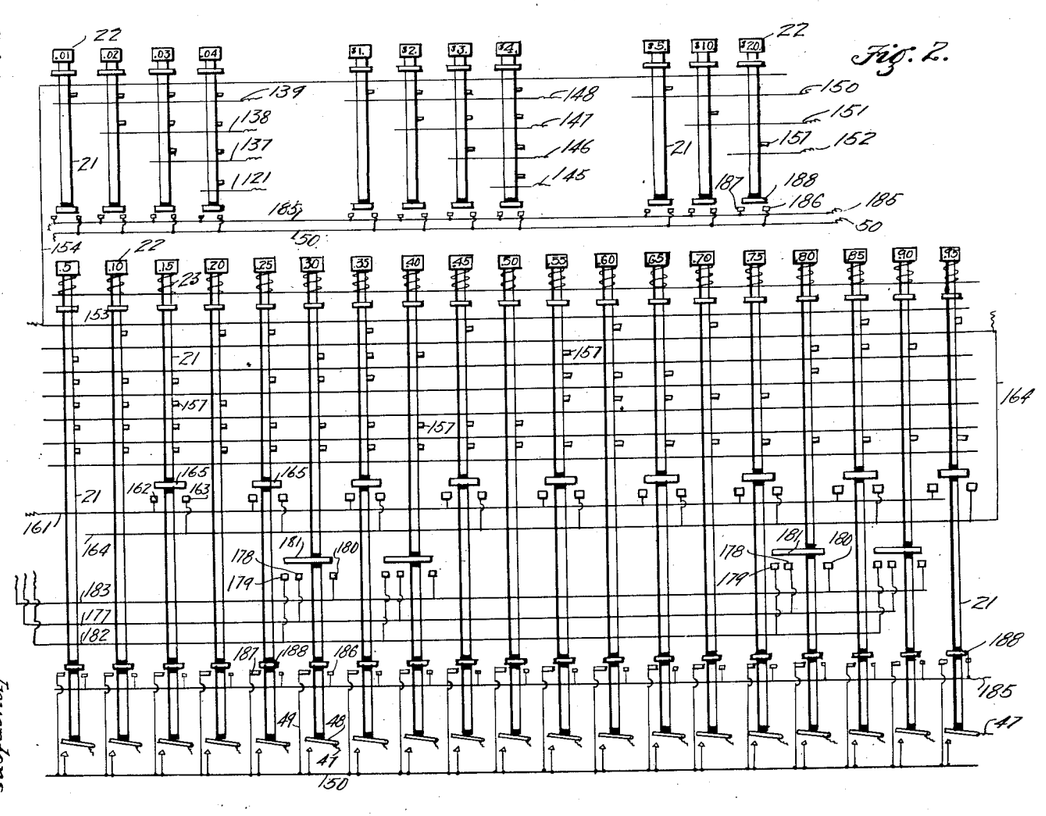
Fig. 2 is a detail illustrating the bank of purchase keys and electrical contacts controlled thereby, illustrated in diagram.

Positive bus-bars 153 and 154 connecting with a conductor 155 leading from the positive side of the source of electrical energy 46 are positioned above the uppermost negative bus-bars adjacent the stems of the bank of register keys 21 and the one cent bank of register keys, respectively, as particularly shown in Figs. 1 and 2, and mounted on the stems 22 of each of the register keys is a contact member 156 arranged adjacent the bus-bars 153 and 154 and normally out of contact therewith, but adapted to be moved into connection with the positive bus-bars to electrically connect the stems of the keys with the positive side of the source of electrical supply 46 on the depression of the keys.

The stems 22 of the keys are electrical conductors where they extend alongside of the bus-bars and each of the stems is fitted with a plurality of contact members 157 which extend adjacent the bus-bars and are adapted to be moved into connection therewith on the depression of the keys; each of the stems of the various keys for registering the purchases from five cents to twenty dollars being fitted with such number and arrangement of the contact members 157 that when any key is depressed contacts will be made between the stem of the key and all of the bus-bars excepting those connecting with the coin ejector magnets for ejecting coins of the value corresponding to the value indicated on the register key. For instance, the stem of the five cent key has a contact member 157 thereon adapted to connect with all of the bus-bars excepting bus-bar 140 connecting with the five cent controlling magnet 120; the stem of the ten cent key having contacts 157 adapted to connect with all of the bus-bars excepting bus-bar 141 leading to the ten cent controlling magnet 122, and the stem of the fifteen cent key having contacts 157 adapted to connect with all of the bus-bars excepting bus-bars 140 and 141 leading to the five and ten cent coin magnets 120 and 122, and so on, throughout the series.

In the one cent bank of keys the stems are fitted with contacts 157 in such arrangement on the respective keys that when the one cent key is depressed the magnet 121 will operate the discharge of one cent from the container, and when the two cent key is depressed magnets 121 and 129 will operate the discharge of two cents, and so on, throughout the series.

In the general operation of the various parts designated, when a coin is deposited in either of the hoppers 27 or 28 it will operate as a filler to complete a circuit from the source of electrical supply 46 through the conductor 69 and pivoted wall 54 of the hopper through the coin and the contact member on the hopper wall 52 engaging the periphery of the coin, thence, through the conductor connecting with such contact and through the magnet on such conductor, and back to the source of supply through the conductors 89 and 45, thus energizing the magnet to operate one of the series switch members to open the switch to the conductors leading to the ejector magnets controlling the ejection of the coin corresponding to the one deposited, and all coins of a larger denomination so that only coins of a denomination smaller than the one deposited can be discharged. This is the case irrespective of the number of coins deposited; the coin of smallest denomination operating to effect the cutting out of the ejectors for coins of the same denominations and all of those there-above so that it is impossible to discharge a coin of the same or greater denomination than the one deposited. An exception is made, however, in the case of five and ten cent pieces, which, by reason of the frequent combination of dimes, either in the form of a collection of two or more dimes to make a given amount, or the combination of one or more dimes with coins of larger denomination to make a given amount and from which given amount five cents in change is required. This necessitates the provision of means for cutting out the five and ten cent ejector magnets, as far as the series switch is concerned, on a deposit of either a five or a ten cent piece. This is effected by connecting the contacts 90 and 92 so that the deposit of either a five or ten cent piece will operate on energizing either the magnet 80 or 82 to throw out the switch contacts 90 and 92. This necessitates the provision of an auxiliary circuit, which is controlled by the keys 21 for recording sales of five cents and those ending in five cents, as fifteen cents, twenty-five cents and thirty-five cents, etc. This circuit includes a conductor 158 which connects with the conductor 70 leading from the contact 60 to the magnet 80 and leads to a pivoted two-way switch member 159, which normally engages a contact member 160 which connects with conductors 161 and 161'. The conductor 161 connects with a correspondingly numbered bus-bar disposed adjacent the stems 22 of the keys 21 and has a series of contact members 162 thereon spaced from contact members 163 on a conductor 164 connecting with the five cent bus-bar and conductor 140. A pair of the contact members 162 and 163 are arranged adjacent the stem 22 of each key 21 for indicating five cent sales and sales ending in five, as fifteen cents, twenty-five cents, thirty-five cents, etc., and mounted on the stems of said keys and insulated therefrom are contact plates 165 adapted to connect the plates 162 and 163 when their keys are depressed.

The conductor 161 connects with the negative terminal of the source of electrical supply 46 through a conductor 166, on which conductor a switch operating magnet 167 is disposed. This magnet 167 is designed, when energized, to open a normally closed switch member 168 connecting the positive bus-bar 153 to the conductor 155. The conductor 161' connects with one terminal of a magnet 169, the other terminal of which connects with a conductor 170 connecting with the conductor 89; the magnet 169 being provided for the purpose of operating a normally open switch member 171 connecting with the conductor 170 normally out of engagement with a contact member 172 on a conductor 173 connecting with the conductor 110 leading to the five cent ejector magnet 120.

The manner of operation of the auxiliary five cent circuit just referred to will be clearly set forth hereinafter in making change between a ten cent deposit and a five cent sale by the depression of the five cent key; this auxiliary circuit being employed only in instances where change of five cents is required from the deposit of a dime, and operates irrespective of whether the dime is deposited alone or in plurality or in combination with other coins.

Another exception to the general operation of the device arises in depositing a dime or dimes in combination with twenty-five cent pieces, particularly where the required change is five cents. To meet this condition the following circuit is provided: Leading from the conductor 73 connecting the twenty-five cent contact 63 with the magnet 83 is a conductor 174 which connects with the terminal of a magnet 175, the other terminal of which connects with a conductor 89. The magnet 175 is designed, when energized, to operate the switch member 159 to move it out of contact with the switch member 160 into connection with a contact member 176 on a conductor 177 leading to a correspondingly numbered bus-bar. The bus-bar 177 connecting with contacts 178 arranged in spaced relation to contacts 179 and 180 disposed adjacent the stems 22 of the register keys representing the thirty, forty-five, eighty and ninety cent purchase keys; the contact plates 181 being mounted on the stems of said keys in such position as to be normally out of contact with the contacts 178, 179 and 180 and are adapted to be moved to connect said contacts on the depression of the keys. The contacts 179 connect with a conductor 182 which connects with the conductor 140 leading to the five cent ejector magnet 120. The contact 180 connects with a conductor 183 leading to the conductor 161' connecting with the magnet 169.

*Operation where the amount of sale and the coins deposited are the same.*—Where the amount of sale corresponds to the value of the coins deposited in the hoppers and it is desired to ring up the sale without effecting the discharge of coins from the change-making device, the operation will be as follows, reference being had to Fig. 1: Assume that a fifty cent piece is deposited in the hopper 27 to close the circuit through the contact 64, conductor 74 and magnet 84, the magnet 84 will be energized to move the contact member 94 out of connection with the contact 104, thus opening the switch member to the conductor 114 leading to the coin ejector magnet 124 controlling the fifty cent ejecting device, thus placing the latter and all of the coin ejector magnets throwing the coin ejectors of denominations of coins larger than fifty cents, out of operative connection. The fifty cent key is then depressed and will perform no operation as far as the general mechanism is concerned by reason of the contacts 157 on the stem thereof connecting the bus-bars cut out by the separation of the contact members 94 and 104. The depression of the fifty cent key, however, will close the switch member 48 to the contact 49 so as to complete the circuit to the annunciator and recording device to operate the annunciator indicating a fifty cent purchase and to actuate the recording device to record the amount registered. In like manner the deposit of any coin from five cents to twenty dollars will operate to cut out the circuits to the ejector magnets controlling the discharge of coins of the denominations corresponding to the one deposited and all connections there-above.

Figure 3:
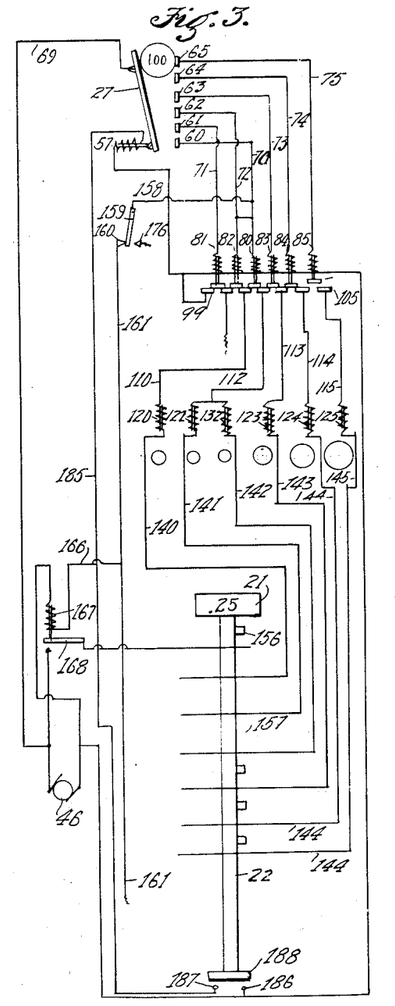
Fig. 3 is a diagram illustrating the manner of making change on the deposit of a dollar with a twenty-five cent purchase.

*Operation in making change from a dollar.*—A simple change making operation is illustrated in Fig. 3, showing, for example, the manner of making change from a dollar deposit and the operation of the twenty-five cent purchase recording key. On depositing the dollar in the hopper 27 the circuit is made through the magnet and to contact 65, conductor 75 and magnet 85, whereby the latter is energized and caused to open the contact 95 to cut out the series switch and contact 105 so as to place the electrical connections therewith in inoperative condition. On depressing any of the sales register keys 21 ranging from five cents to ninety-five cents corresponding to the difference between the amount indicated by the register key and the dollar coin will be ejected from the apparatus. Assume the twenty-five cent key is depressed; current will then flow from the source of electrical supply 46 through conductor 155, switch 168, bus-bar 153; contact member 156, stem 22 and contacts 157 connecting with the conductors 143 and 144 on the twenty-five cent key; thence through conductors 143 and 144, ejector magnets 123 and 124, conductors 113 and 114, contacts 103 and 104, thence through the series switch and the terminal contact 99 thereof to the conductor 89, from whence it passes to the negative return conductor 45 leading to the other side of the source of electrical supply 46. This circuit energizes the ejector magnets 123 and 124, which operates to discharge a twenty-five and fifty cent piece, which is the required change. The principal applied in this change making operation is that the deposit of the coin operates to cut out all the change making devices ranging from that of the coin deposited upward, and the arrangement of the contact members 157 on the stems of the various register keys, whereby the depression of the latter will effect the completing of circuits through the ejector device or devices, corresponding to the coin or value represented by the key depressed and the ejector devices not rendered inoperative by the coin.

Figure 4:
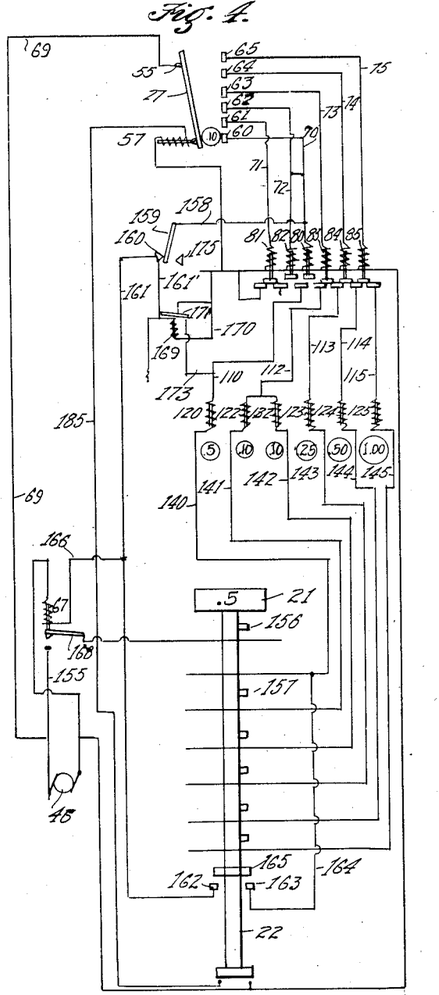
Fig. 4 is a diagram illustrating the manner in which the discharge of a five cent coin is effected when a dime is deposited and the amount of the purchase is five cents.

*Operation where five cents change is required from a deposit of a dime.*—Reference being had to Fig. 4, when a dime is deposited in the hopper 27 it will operate to close the circuit through the magnet 80, which on being energized will operate to move the contacts 90 and 92 out of connection with the contacts 100, 101, and 102, thus cutting out all of the ejector magnets ranging from the five cents to twenty dollars ejector, inclusive, as far as the series switch is concerned. The dime, however, in completing the circuit to the conductor 70 places the bus-bar 161 and the contacts 162 therein in a live condition and cutting out the bus-bar 153, this latter operation being effected by the flow of current from the conductor 70 to conductor 158, switch 159, contact 160, conductors 161 and 166 and through the magnet 167, thereby energizing the latter and causing the switch 168 to open and break the connection between the bus-bar 153 and conductor 156. If it is desired to ring up a ten cent sale at this point, the ten cent key could be depressed without operating the change making mechanism. To effect the discharge of five cents change the five cent key is depressed so as to move the contact plate 165 and stem thereof into connection with the contact members 162 and 163. A current will then flow from the conductor 161 through contacts 162, 165 and 163, conductors 164 and 140, through ejector magnet 120, conductor 73, contact 172, switch member 171, conductor 170 and negative conductor 89; the switch 171 being previously closed to the contact 172 by current passing to conductor 161 and magnet 169. The current passing through the ejector magnet 120 will operate to actuate the ejector to discharge a five cent piece therefrom. The depression of the five cent key will also complete the annunciator circuit to record the amount of the sale. The above operation applies in all instances where a dime is deposited either with other dimes or coins of larger denomination in which it is desired to discharge five cents change as in the case of a deposit of four dimes or forty cents and the operation of the thirty-five cent register key and the deposit of a fifty cent piece and three dimes with the operation of the seventy-five cent key, and so on.

Figure 5:
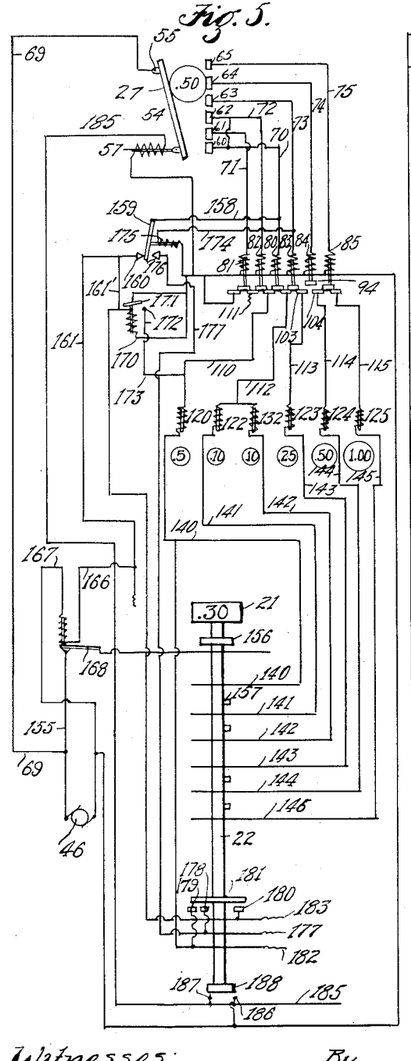
Fig. 5 is a diagram illustrating the manner of making change from a deposit of a fifty cent piece, with a thirty cent purchase.
Figure 15:
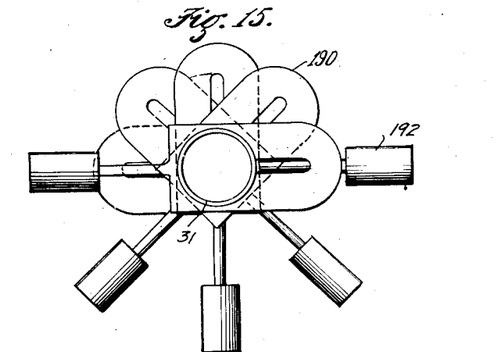
Fig. 15 is a detail in plan of the coin ejector as arranged to discharge one or a plurality of coins.

*Operation where it is necessary to eject two or more coins of the same denomination to make the required change.*—Fig. 5 illustrates the manner in which two coins of the same denomination are ejected in order to make the proper change, as in the case of a fifty cent deposit and a thirty cent purchase, which is employed as an example. On depositing a fifty cent coin the magnet 84 is operated to move the contact 94 out of connection with the contact 104 to break electrical connections to the ejector magnets 130 ranging from the fifty cent ejector magnet 124 upward. On depression of the thirty cent key the circuit will be completed through the contacts 157 thereon connecting with the conductors 141 and 142 leading to the ejector magnets 122 and 132; the current passing thence through the conductor 112 in the series switch conductors 89 and 45 as before described. The magnets 122 and 132 on being energized operates separate coin ejectors, such as shown in Fig. 15, which will be later described, by which two dimes will be discharged from the coin container, thus making the required change. The same operation would apply with a dollar deposit and a thirty cent sale, with the exception that on the operation of the thirty cent registering key the circuit will be closed through the fifty cent ejector magnet 124 as well as through ejector magnets 122 and 132 so that a fifty cent piece and two dimes will be ejected.

Figure 6:
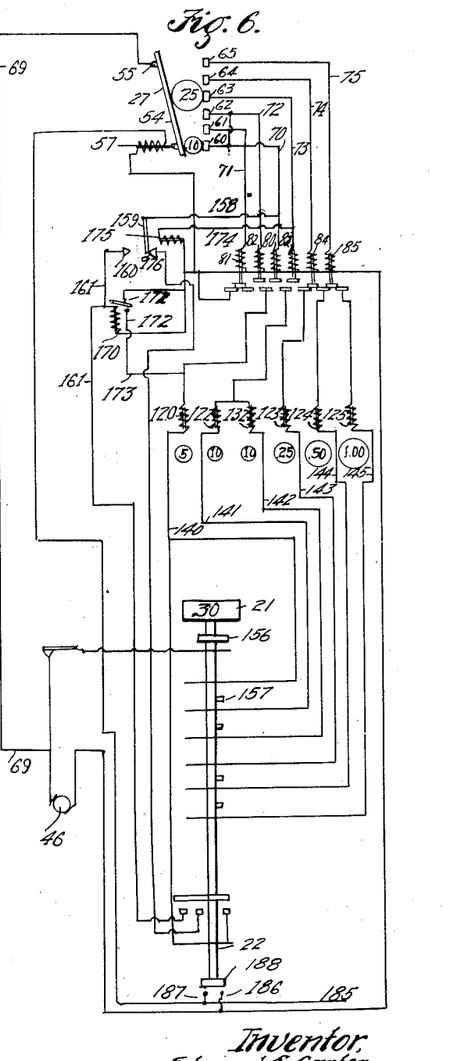
Fig. 6 is a diagram illustrating the manner of making change on a thirty cent purchase with the deposit of a ten cent and a twenty-five cent piece.

*Operation where dime is combined with a twenty-five cent piece, where five cents change is required.*—A condition arises where a ten cent piece and a twenty-five cent piece are deposited simultaneously in the hopper, either alone or in combination with other coins of larger denomination, or series of coins of the same denomination and where the change, if any was required, would manifestly be smaller than a dime, that is, five cents. The manner of operation in this instance is particularly shown in Fig. 6, illustrating the deposit of a ten cent piece and a twenty-five cent piece on a thirty cent purchase.

The initial operation of a deposit of a dime and a twenty-five cent piece will be to close circuits through magnets 80 and 83, which will open the contacts 90, 92, and 93 of the series switch. Current will then be directed to the auxiliary five cent and twenty-five cent circuits according to which coin first completes the circuit. Assuming that the twenty-five cent piece will make its contact first, the current will pass from the source of electrical supply through the conductor 69, the twenty-five cent piece, conductor 73, conductor 174, magnet 175, conductor 89 and back to the source of electrical supply through the negative conductor 45. This circuit energizing the magnet 175 operates to move the switch contact 159 out of connection with the contact 160 and into connection with the contact 176, whereupon current from the source of electrical supply passing through the dime will flow through conductors 70, 158, switch contacts 159 and 176, conductor and bus-bar 177 to contact 178, thence through the contact plate 181 on the stem 22 of the thirty cent register key previously depressed, thence through contacts 179 and 180 to conductors 182 and 183, the current passing through conductor 183 passes through conductors 161' and 161 and 166 to energize the magnet 167 and break the switch 168 and also passes through magnet 169, conductor 170, so as to energize magnet 168 and close the switch contact 171 to contact 172. The current passing through the conductor 182 will then flow through conductor 140, five cent ejector magnet 120, conductor 173, contacts 172 and 171, conductor 170 to conductor 89 connecting with the negative side of the source of electrical supply. This latter current energizes the five cent ejector magnet 120 and thereby discharges the five cent coin and makes the proper change. A corresponding operation would occur if two dimes were deposited with the twenty-five cent piece and the forty cent register key depressed, and likewise where similar combinations are employed.

Means are provided for automatically discharging the coins deposited in the hoppers 27 and 28 controlled by the register keys and operable when the keys are depressed to their lowermost positions or a point to which all the foregoing described operations controlled by the keys are subsequent. This means consists of solenoid magnets 57, the cores 58 of which are connected with the pivoted side plate 54 of the hoppers 27 and 28. One terminal of the magnets 57 connect with conductors leading to the conductor 89 and the opposite terminals connect with a conductor 185 having a series of contact members 186 thereon spaced from contact members 187 connecting with the conductor 50 and arranged adjacent each of the stems 22 of the register keys and adapted to be connected together by contact plates 188 on the stems when the latter are depressed so as to direct current to the solenoid through the switch 57, which, when energized, will operate to swing the plates 54 in opposition to the springs 56 to release the coins contained in the hoppers and discharge them into the separating chutes 29 and 30. The coins on entering the chutes will be distributed according to their sizes by means of graduated perforations formed in the receiving chute and will be directed to the various coin containers 31 where they will be disposed in stacks upon the coin ejectors.

Any suitable coin ejecting device may be employed, such, for instance, as illustrated in Figs. 8, 9, 10 and 15 of the drawings in which Figs. 8, 9 and 10 showing an ejector for discharging a single coin and Fig. 15 shows an ejector for discharging one or more coins. In these views, 31 indicates the coin container which is fitted with a horizontally extending slide 190 at its lower end guided in the walls of the container and having an opening 191 therein corresponding to the diameter of the coin contained in the hopper; the slide 190 being approximately the same thickness as the coin. The slide 190 is designed to be operated by the ejector magnets before referred to and designated in Figs. 8, 9 and 10 as 192. The slides 190 are normally disposed in an advanced position by means of a spring 193 so that a stack of the coins are in the container 31, the lowermost coin will rest on the bottom of the container in the opening 191 in the slide.

On the energizing of the magnet 192 it will operate to draw its core 194 connected to the slide 190 in the direction indicated by the arrow —a— in Fig. 8 in such manner as to cause the coin engaged by the slide to be moved therewith into a position exteriorly of the container where it will fall from the slide into the hopper 32 and be delivered to the change receptacle or pocket 33 on the exterior of the register case. Where it is necessary to eject two or more coins from the container 31 a plurality of the slides 190 are provided, as shown in Fig. 15, these slides being arranged one above the other or disposed at different angles. By this arrangement when one of the magnets 192 is energized a single slide 190 will be operated to cause the ejection of a single coin, but when two or more of the magnets 192 are energized a corresponding number of the slides will be operated to effect the ejection of a corresponding number of coins.

Figure 7:
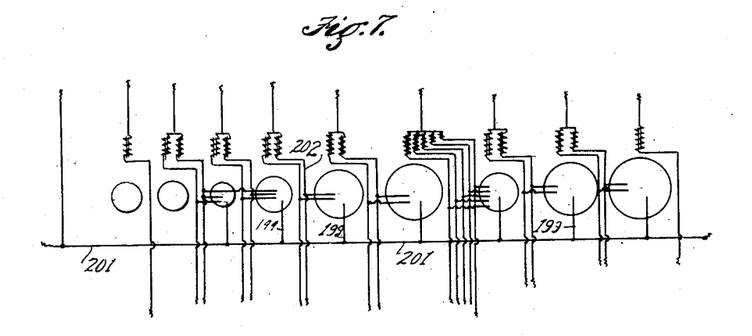
Fig. 7 is a diagram illustrating the electrical connections whereby, in event the coin containers of the higher denominations become empty, the corresponding value in coins of smaller denomination will be ejected.

Means are provided, whereby, in event any of the coin containers 31 become empty coins of a corresponding value will be automatically ejected from their respective containers. This means is here shown in Figs. 8, 9 and 10 as consisting of an arm 195 pivoted at 196 adjacent the container 31 and normally positioned vertically as shown in Fig. 1. One end of the arm 95 is connected to the core 197 of a solenoid magnet 198 connected in series with the magnet 192 and adapted, when energized, to rock the arm 195 inwardly through a slot in the coin container 31. The outer end of the arm 195 is formed with a finger 199 which, in event there are coins in the container, will strike the coin and be thereby inhibited from movement. If the container is empty the finger 199 will pass through the perforation 191 in the slide 90 and strike a contact member 200 so as to complete a circuit from a conductor 201 connecting with the arm 199 through the contact 200, a conductor 202 connected therewith leading to one or more ejector magnets controlling the ejector slides of the adjacent coin container as illustrated in Fig. 7. For instance, in event the fifty cent container is empty and the magnet 124 for operating the coin ejector device is energized the arm 195 will be actuated by the energizing of the magnet 198 and caused to move into the position indicated in dotted lines in Fig. 8 in connection with the contact member 200, thus completing the circuit through the conductor 202 from the conductor 201 through the arm 195, thereby energizing a pair of the ejector magnets on the twenty-five cent container which will operate to discharge two twenty-five cent pieces as an equivalent of the fifty cent piece. A similar arrangement is provided for each successive ejector, an extra ejector magnet being provided where necessary to effect the discharge of two or more coins where required.

The mechanism controlled by the deposit of gold coins in the hopper 28 operates in a similar manner to that before described. Even change keys are provided where it is desired to deposit a coin and change into coins of smaller denomination, in which event the necessary number of coin ejector magnets and ejecting devices are provided on the coin container. As the construction of such a device is merely a repetition of the construction before described, such arrangement is not here shown.

For the purpose of changing currency, drawers having connections corresponding to those shown in the coin receiving hopper may be provided so that in opening a drawer, to deposit a bill of a certain denomination therein, contacts will be made in the manner corresponding to the depositing of a coin and the change made accordingly.

What we claim is:

1. In a change maker, a hopper adapted to receive coins of different diameters and values, a series of coin containers, a coin ejector on each container, a magnet for operating each ejector, normally open electrical circuits connecting with said means by which the depositing of a coin will operate to cut out the magnets controlling ejectors of coins corresponding to the coin deposited in the hopper together with those controlling ejectors of coins of a higher denomination, a bank of keys representing sales of different amounts, and means whereby the operation of said keys will operate when a coin is deposited in the hopper to close circuits through the magnets controlling coin ejectors for discharging coins of a value equivalent to the difference between an amount designated by the operated key and the amount deposited in the hopper.

2. In a change maker, a hopper adapted to caliper coins of different diameters, a plurality of contact members in said hopper, electrical circuits connecting each of said contact members, magnets in each of said circuits, a series switch comprising a series of normally closed contact members adapted to be operated by the energizing of any of the magnets on energizing of the latter to open the series switch at various points, a plurality of coin receivers, a coin ejector for each receiver, a magnet for actuating each coin ejector, electrical connections between said magnets and the series switch, a bank of keys, and means on the keys for controlling circuits to the ejector magnets, whereby the depression of the key will effect the discharge of a coin or coins of a value less than the value of the coin or coins deposited in the hopper.

3. The combination with a bank of cash register keys of a series of bus-bars, contact members controlled by said keys normally out of connection with the bus-bars, coin containers, a coin ejector on each of said containers, a magnet adapted to operate each ejector, electrical connections between said magnets and the bus-bars, a coin receptacle, means by which the deposit of a coin in said receptacle will operate to control the flow of electrical current to the ejector magnets, means whereby the depression of a key will operate to complete electrical circuits through the bus-bars and ejector magnets according to the difference between the value of a coin deposited in the hopper and the amount of the sale represented by the key depressed to effect the discharge of a coin or coins from the containers, and automatic means operating when a container on which the ejector is operated is empty will act to effect the discharge of coins corresponding in value from either of the containers.

4. In an electrical change maker, a coin receiving hopper, an inclined electrical contact member in said hopper connected with one terminal of a source of electrical supply, a series of spaced contact members adapted to be electrically connected to the first named contact member on the deposit of a coin in the receptacle according to the diameter of the coin, a magnet connected to each of said spaced contact members connected with the other terminal of the course of electrical supply, a series of coin receptacles, coin ejectors thereon, magnets for operating said ejectors, normally closed switches for controlling the flow of current to said ejector magnets adapted to be actuated by the before-mentioned magnets, a bank of normally open contacts, keys for controlling said contacts, and connections between the contacts and the coin ejectors and the source of electrical supply, whereby the depression of a key will coöperate with a coin deposited in the hopper to complete a circuit through a coin ejector magnet to operate the ejector and for the discharge of a coin from the container.

5. In an electrical change maker, a coin receiving hopper, an inclined electrical contact member in said hopper connected with one terminal of a source of electrical supply, a series of spaced contact members adapted to be electrically connected to the first named contact member on the deposit of a coin in the receptacle according to the diameter of the coin, a magnet connected to each of said spaced contact members connected with the other terminal of the source of electrical supply, a series of coin receptacles, coin ejectors thereon, magnets for operating said ejectors, normally closed switches for controlling the flow of current to said ejector magnets adapted to be actuated by the before-mentioned magnets, a bank of normally open contacts, keys for controlling said contacts, connections between the contacts and the coin ejectors and the source of electrical supply, whereby the depression of a key will operate with a coin deposited in the hopper to complete a circuit through a coin ejector magnet to operate the ejector and for the discharge of a coin from the container, and means operable to effect the discharge of coins from adjacent containers when the container having the actuated coin ejector thereon is empty.

6. The combination with a bank of cash register keys, of a coin receiving hopper, a series of coin containers for receiving coins of different denominations, a coin ejector for each of said containers, a cash register key operated means for operating each coin ejector of denominations equal to the difference between the denominations of a selected key and each higher denomination of coin, means operated by the coins received for disconnecting from operation all coin ejectors of a higher denomination than that of the coin received, cash register key auxiliary operating means on said keys for operating certain coin ejectors, auxiliary means operated by coins of certain denominations for disconnecting the said cash register key operated means and connecting in operation said cash register key auxiliary operating means whereby on placing a combination of coins in said coin receiving hopper and operation of selected cash register keys the proper change will be ejected.

7. The combination with a bank of cash register keys, of a coin receiving hopper, a series of coin containers for receiving coins of different denominations, a coin ejector for each of said containers, a magnet for operating each of said coin ejectors, electric circuit control means operated by each of said cash register keys in circuit with said magnets for operating each coin ejector of denominations equal to the difference between the denominations of a selected key and each higher denomination of coin, electric circuit control means operated by the coins received for disconnecting from operation all coin ejectors of a higher denomination than that of the coin received, auxiliary circuit control means connected to said magnets operated by certain keys for operating said coin ejectors, auxiliary circuit control means operated by coins of certain denominations for disconnecting from circuit said electric circuit control means and connecting in operation said auxiliary circuit control means whereby on placing a combination of coins in said coin receiving hopper and operation of selected cash register keys the proper change will be ejected.

8. The combination with a bank of cash register keys, of a coin receiving hopper, a series of coin containers for receiving coins of different denominations, a coin ejector for each of said containers, a cash register key operated means for operating each coin ejector of denominations equal to the difference between the denominations of a selected key and each higher denomination of coin, means operated by the coins received for disconnecting from operation all coin ejectors of a higher denomination than that of the coin received, cash register key auxiliary operating means on said keys for operating certain coin ejectors, auxiliary means operated by coins of certain denominations for disconnecting the said cash register key operated means and connecting in operation said cash register key auxiliary operating means whereby on placing a combination of coins in said coin receiving hopper and operation of selected cash register keys the proper change will be ejected, and means operable to effect the discharge of coins from adjacent containers when the container having the actuated coin ejector thereon is empty.

9. The combination with a bank of cash register keys, of a coin receiving hopper, a series of coin containers for receiving coins of different denominations, a coin ejector for each of said containers, a magnet for operating each of said coin ejectors, electric circuit control means operated by each of said cash register keys in circuit with said magnets for operating each coin ejector of denominations equal to the difference between the denominations of a selected key and each higher denomination of coin, electric circuit control means operated by the coins received for disconnecting from operation all coin ejectors of a higher denomination than that of the coin received, auxiliary circuit control means connected to said magnets operated by certain keys for operating said coin ejectors, auxiliary circuit control means operated by coins of certain denominations for disconnecting from circuit said electric circuit control means and connecting in operation said auxiliary circuit control means whereby on placing a combination of coins in said coin receiving hopper and operation of selected cash register keys the proper change will be ejected, and electric circuit control means connected with said magnets to operate said ejectors for effecting the discharge of coins from adjacent containers when the container having the actuated coin ejector thereon is empty.

In witness that we claim the foregoing we have hereunto subscribed our names this 18th day of April, 1914.

EDWARD E. CARTER.
ERNEST LIGHTFOOT.

Witnesses:
MARGUERITE BATES,
MARIE BATTEY.